United States Patent
Galbraith et al.

(10) Patent No.: US 11,049,520 B1
(45) Date of Patent: Jun. 29, 2021

(54) DATA STORAGE DEVICE EMPLOYING MULTI-TIER CODING FOR MAGNETIC TAPE

(71) Applicant: Western Digital Technologies, Inc., San Jose, CA (US)

(72) Inventors: Richard L. Galbraith, Rochester, MN (US); Weldon M. Hanson, Rochester, MN (US); Derrick E. Burton, Ladera Ranch, CA (US); Niranjay Ravindran, Rochester, MN (US); Iouri Oboukhov, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/870,658

(22) Filed: May 8, 2020

(51) Int. Cl.
*G11B 5/09* (2006.01)
*G11B 20/18* (2006.01)
*G11B 5/008* (2006.01)

(52) U.S. Cl.
CPC ...... *G11B 20/1833* (2013.01); *G11B 5/00813* (2013.01); *G11B 2020/185* (2013.01); *G11B 2020/1863* (2013.01)

(58) Field of Classification Search
None
See application file for complete search history.

(56) References Cited

U.S. PATENT DOCUMENTS

| | | | |
|---|---|---|---|
| 5,942,005 A | 8/1999 | Hassner et al. | |
| 6,282,039 B1* | 8/2001 | Bartlett | G11B 20/12 360/47 |
| 6,539,514 B1* | 3/2003 | Bartlett | G11B 5/00826 360/48 |
| 8,316,281 B2 | 11/2012 | Gill et al. | |
| 8,499,228 B2* | 7/2013 | Heinrich | H03M 13/6502 714/786 |
| 8,854,759 B2 | 10/2014 | Cideciyan et al. | |
| 9,318,148 B2 | 4/2016 | Cideciyan et al. | |
| 9,385,759 B2 | 7/2016 | Anderson | |
| 10,373,645 B2 | 8/2019 | Burton et al. | |
| 10,417,089 B2 | 9/2019 | Oboukhov et al. | |
| 10,530,390 B2 | 1/2020 | Oboukhov et al. | |
| 10,592,334 B2 | 3/2020 | Oboukhov et al. | |
| 2008/0052592 A1* | 2/2008 | Tan | H03M 13/2921 714/758 |
| 2008/0055122 A1* | 3/2008 | Tan | H03M 13/1102 341/52 |
| 2013/0305114 A1* | 11/2013 | Olcay | H03M 13/1128 714/755 |
| 2013/0335850 A1* | 12/2013 | Han | H03M 13/6337 360/53 |
| 2014/0281793 A1 | 9/2014 | Patapoutian | |
| 2019/0250987 A1* | 8/2019 | Oboukhov | G06F 3/064 |

* cited by examiner

*Primary Examiner* — Peter Vincent Agustin

(57) ABSTRACT

A data storage device is disclosed comprising at least one head configured to access a magnetic tape. Data is read from the magnetic tape to generate a read signal which is processed to decode a first M blocks of low density parity check (LDPC) type codewords using a LDPC type decoder. First un-converged codewords out of the first M blocks are decoded using a first M-blocks parity, and second un-converged codewords out of the first M blocks are decoded using an erasure code.

18 Claims, 6 Drawing Sheets

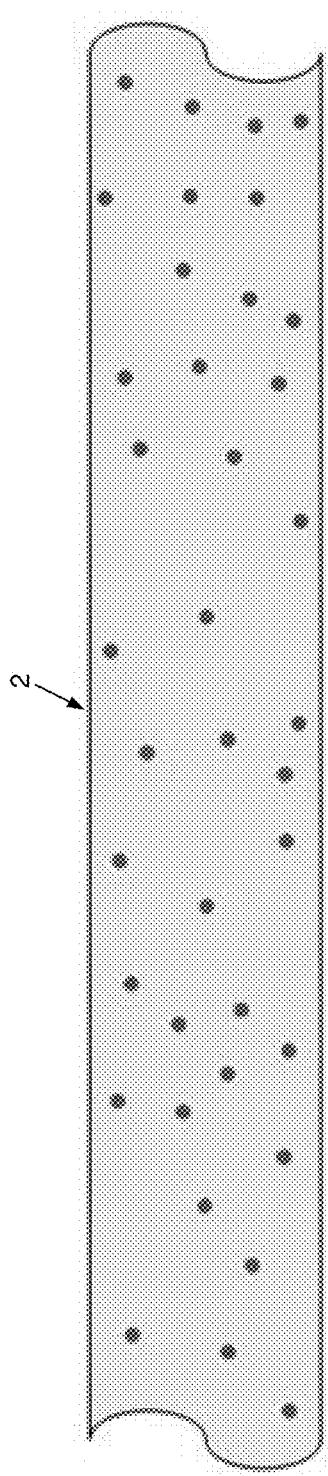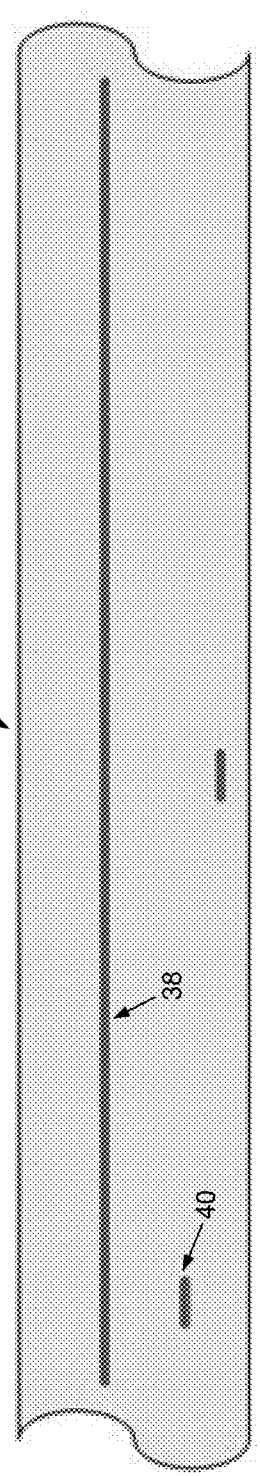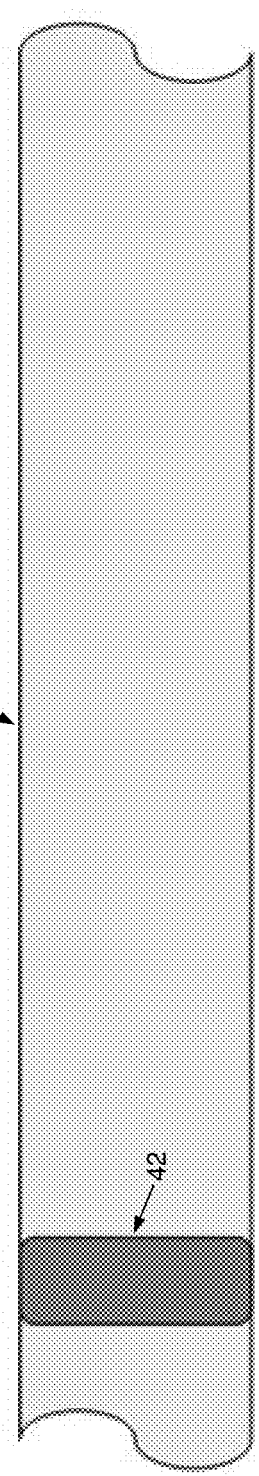

DATA STORAGE DEVICE EMPLOYING MULTI-TIER CODING FOR MAGNETIC TAPE

BACKGROUND

Conventional tape drive storage systems comprise a magnetic tape wound around a dual reel (reel-to-reel cartridge) or a single reel (endless tape cartridge), wherein the reel(s) are rotated in order to move the magnetic tape over one or more transducer heads during write/read operations. The format of the magnetic tape may be single track or multiple tracks that are defined linearly, diagonally, or arcuate with respect to the longitudinal dimension along the length of the tape. With a linear track format, the heads may remain stationary relative to the longitudinal dimension of the tape, but may be actuated in a lateral dimension across the width of the tape as the tape moves past the heads. With a diagonal or arcuate track format, the heads may be mounted on a rotating drum such that during access operations both the heads and tape are moved relative to one another (typically in opposite directions along the longitudinal dimension of the tape).

BRIEF DESCRIPTION OF THE DRAWINGS

FIG. 6A shows an embodiment wherein random errors in the data written to the magnetic tape may be corrected by the LDPC type decoder.

FIG. 6B shows an embodiment wherein burst errors in the data written to the magnetic tape may be corrected by the LDPC type decoder enhanced by hard erasures.

FIG. 6C shows an embodiment wherein a large block of errors in the data written to the magnetic tape may be corrected by the erasure code.

DETAILED DESCRIPTION

Figure 1A:
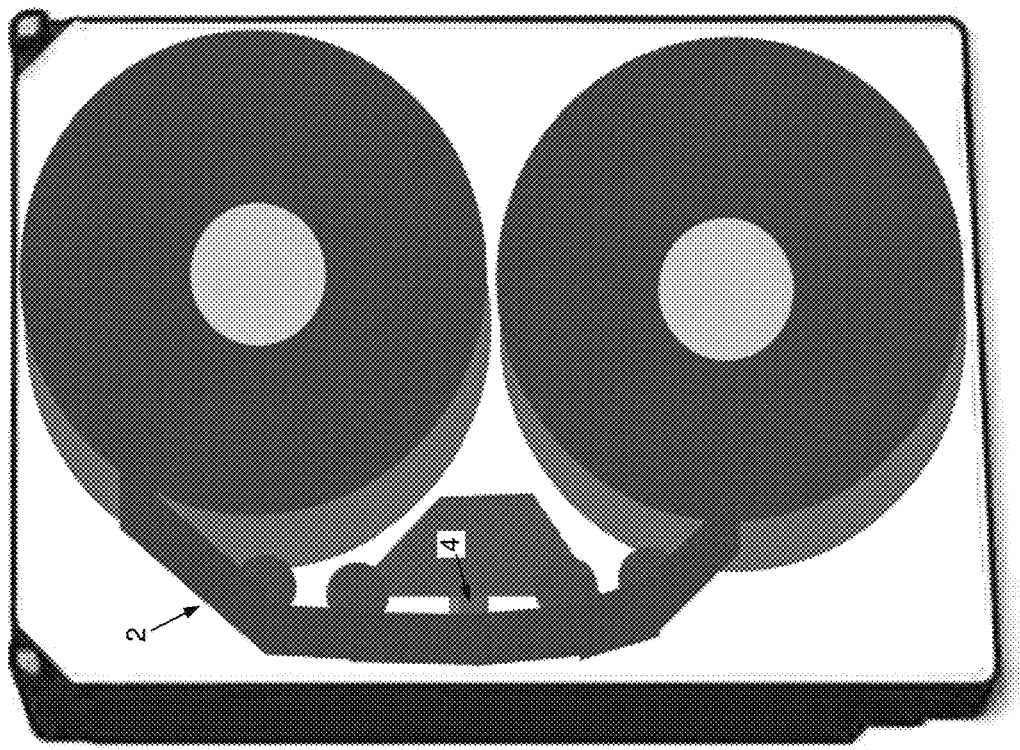
FIG. 1A shows a data storage device according to an embodiment comprising at least one head configured to access a magnetic tape.
Figure 1B:
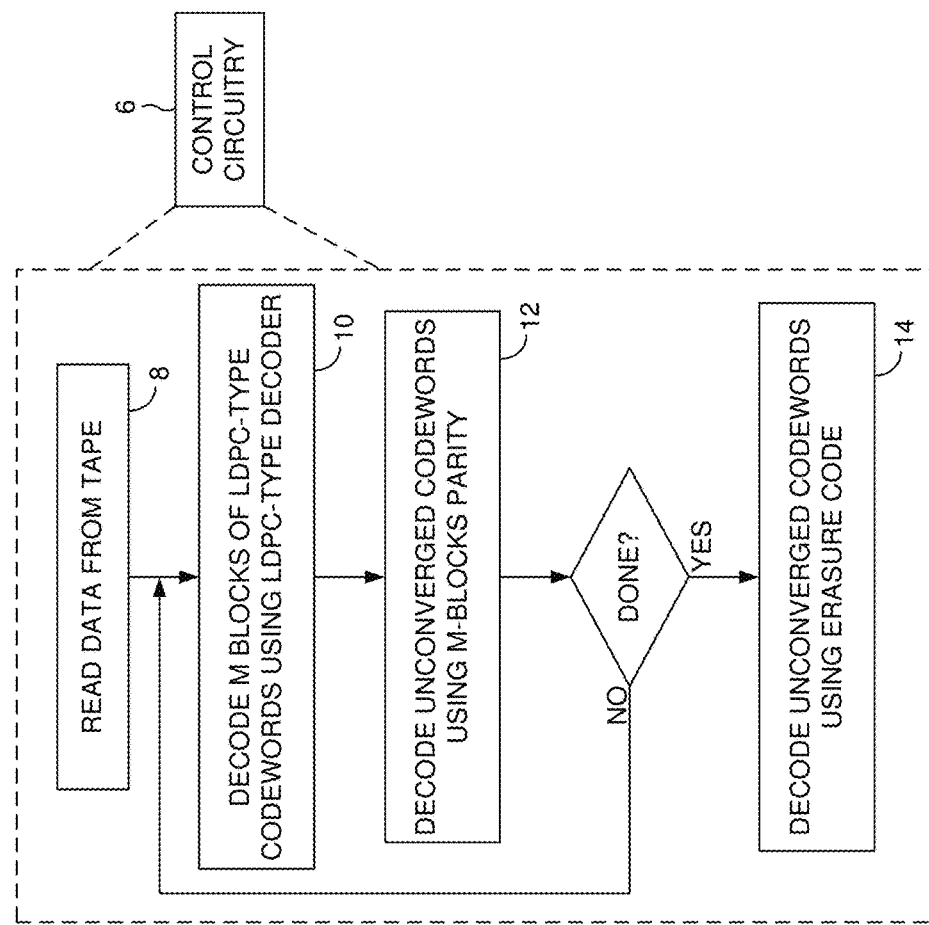
FIG. 1B is a flow diagram according to an embodiment wherein data read from the magnetic tape is decoded in three tiers, including a low density parity check (LDPC) type decoder for decoding LDPC type codewords, a parity block, and an erasure code.

FIGS. 1A and 1B show a data storage device according to an embodiment comprising a magnetic tape 2 and at least one head 4 configured to access the magnetic tape 2. The data storage device further comprises control circuitry 6 configured to execute the flow diagram of FIG. 1B, wherein data is read from the magnetic tape to generate a read signal (block 8) which is processed to decode a first M blocks of low density parity check (LDPC) type codewords using a LDPC type decoder (block 10). First un-converged codewords out of the first M blocks are decoded using a first M-blocks parity (block 12), and second un-converged codewords out of the first M blocks are decoded using an erasure code (block 14). It is noted that while FIG. 1A shows the magnetic tape as being embedded within the data storage device as an example, in other embodiments the tape may be inserted via a mechanism such as a cartridge.

Figure 2A:
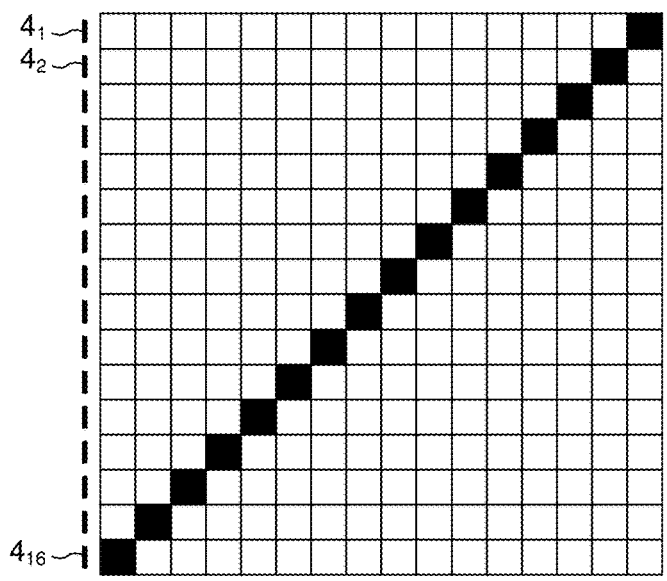
FIGS. 2A-2C shows an embodiment wherein each LDPC type codeword spans a diagonal of an array of detected symbols.
Figure 2B:
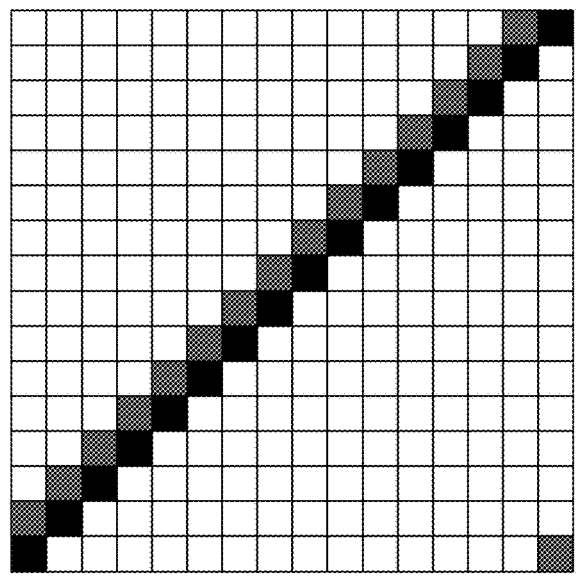
Figure 2C:
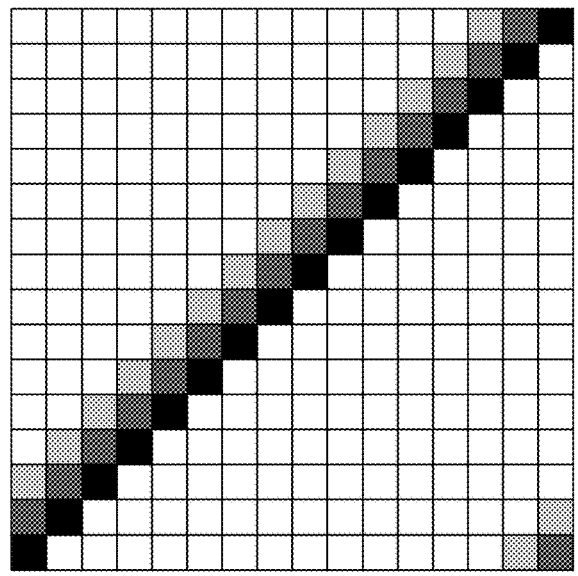

FIG. 2A shows an embodiment wherein the data storage device comprises a plurality of heads $4_1$-$4_{16}$ that are configured to write/read a plurality of longitudinal data tracks along the length of the magnetic tape 2. In the example of FIG. 2A, there are 16 heads that write 16 LDPC type codewords as an array of symbols, wherein each LDPC type codeword spans a diagonal of the of the array. For example, in one embodiment each row of the array consists of 4 kilobytes (4 kB) of data, wherein each cell of a row consists of 4 kB/16=256 bytes. In one embodiment in order to average the signal-to-noise (SNR) across the array, the symbols of each LDPC type codeword are distributed along a diagonal of the array. In the example of FIG. 2A, a first LDPC type codeword is distributed along a first diagonal of the array as represented by the first shaded cells. In the example of FIG. 2B, a second LDPC type codeword is distributed along a second diagonal of the array as represented by the second shaded cells. In the example of FIG. 2C, a third LDPC type codeword is distributed along a third diagonal of the array as represented by the third shaded cells, and so on. Accordingly in the example of FIGS. 2A-2C, there is a block of 16 LDPC type codewords each consisting of 4 kB and each distributed along a diagonal of the array of symbols written to 16 data tracks.

Figure 3A:
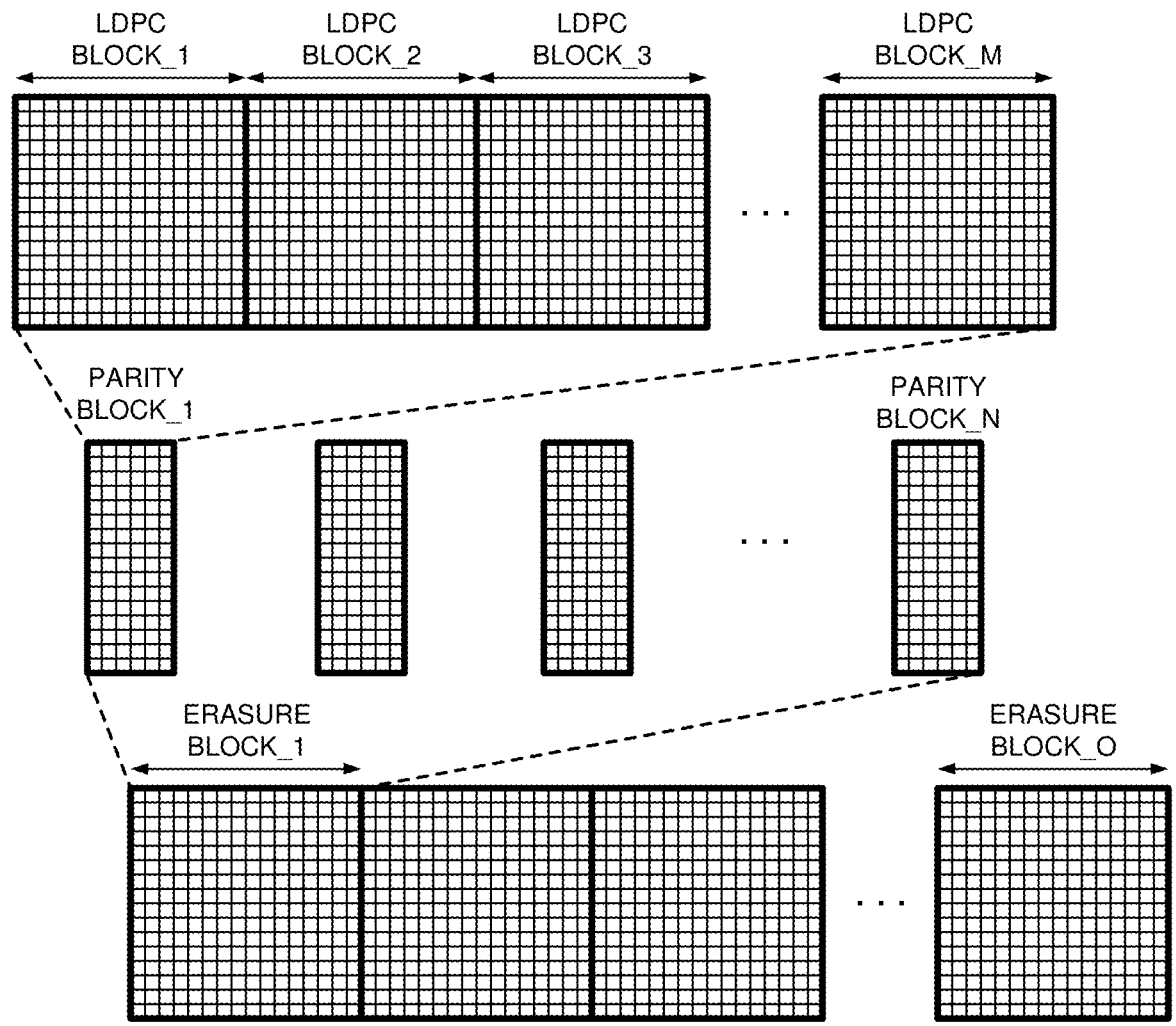
FIG. 3A shows an embodiment wherein data written to the magnetic tape is encoded into M blocks of LDPC type codewords, each of the M blocks is covered by a M-blocks parity, and the erasure code covers a plurality of the M blocks of LDPC type codewords and a plurality of the M-blocks parity.
Figure 4:
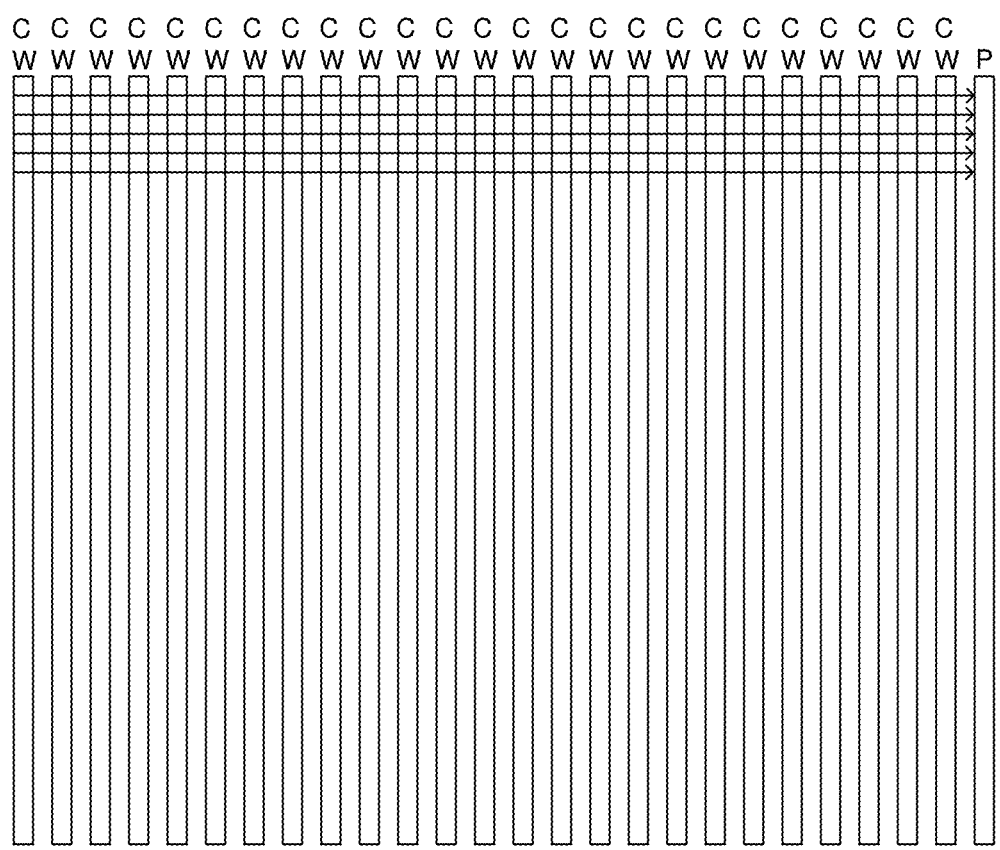
FIG. 4 shows an embodiment wherein an M-blocks parity is generated over the M-blocks of LDPC type codewords.

FIG. 3A shows an embodiment wherein M blocks of LDPC type codewords are written to the magnetic tape, wherein each block comprises a predetermined number of LDPC type codewords (e.g., 16 4 kB codewords as shown in FIGS. 2A-2C). An M blocks parity is generated over the M blocks of LDPC codewords, wherein the M blocks parity may comprise one or more parities generated over a predetermined number of the LDPC type codewords. FIG. 4 shows an example parity (P) generated over a predetermined number of the LDPC type codewords (CW) by XORing the symbols of each codeword. In one embodiment, the resulting parity (P) becomes an additional parity equation enabling a separate iteration of LDPC decoding. In the example of FIG. 3A, there may be 6 blocks of LDPC type codewords (i.e., M=6) and 6 corresponding parities (P) per parity block, where each of the 6 parities (P) may be generated over a corresponding interleave of the LDPC type codewords in the M blocks of LDPC type codewords. In other embodiments, there may be more or less parities (P) generated over the M blocks of LDPC type codewords, including an embodiment wherein when a lower correction power is acceptable, a single parity (P) may be generated over the M blocks in order to achieve a higher code rate.

Figure 3B:
FIG. 3B shows a segment of the magnetic tape according to an embodiment comprising a plurality of M blocks LDPC codewords each having an M-blocks parity, and redundancy of an erasure code that covers the plurality of M blocks and M-blocks parity.

When the LDPC type decoder is unable to decode all of the LDPC type codewords in the M blocks, the M blocks parity may be used to facilitate the decoding of the un-converged codewords. In the embodiment of FIG. 3A, there is a third tier of coding in the form of an erasure code that may be generated over a plurality of the M blocks of LDPC type codewords and a plurality of the M-blocks parity. In one embodiment M=6 and the erasure code is generated over 34 of the parity level sub-blocks (i.e., the erasure code is generated over 34×6=204 LDPC blocks or 204×16=3264 4 kB LDPC type codewords). When there are still un-converged codewords remaining after processing with the M blocks parity, the erasure code is used to decode these remaining un-converged codewords. FIG. 3B shows a segment of the magnetic tape 2 according to an embodiment comprising a plurality of M blocks LDPC codewords $16_1$-$16_N$ each having an M-blocks parity $18_1$-$18_N$ such as shown in FIG. 3A, and redundancy 20 of an erasure code that covers the plurality of M blocks $16_1$-$16_N$ and M-blocks parity $18_1$-$18_N$.

Figure 5:
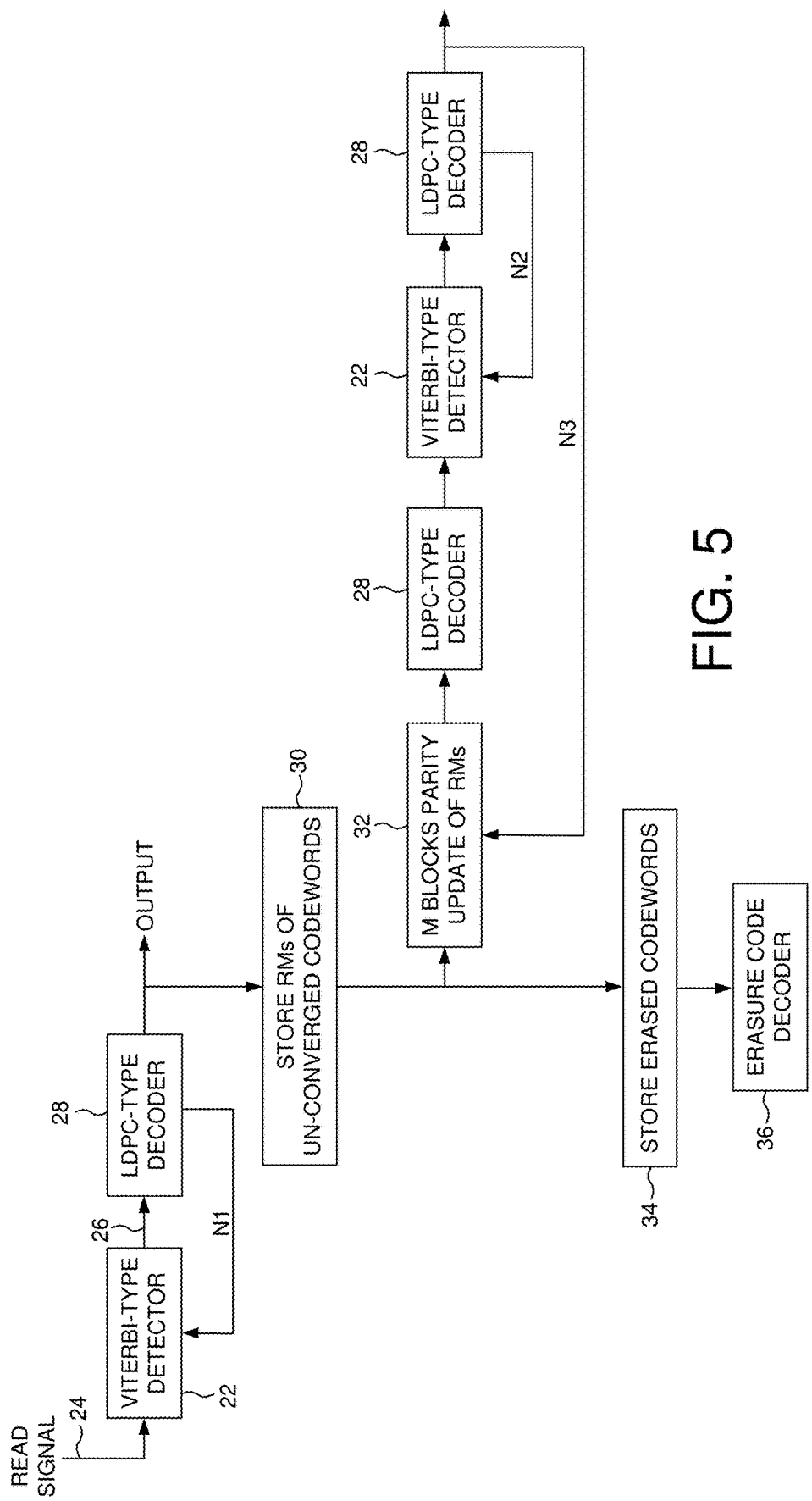
FIG. 5 shows control circuitry according to an embodiment for decoding the LDPC type codewords, wherein un-converged codewords are decoded as erased codewords using the erasure code.

FIG. 5 shows control circuitry according to an embodiment wherein a Viterbi type detector 22 processes the signal samples of a read signal 24 generated by reading a data track on the magnetic tape 2. The Viterbi type detector 22 generates a reliability metric 26 (e.g., a log-likelihood ratio (LLR)) for each symbol of a LDPC type codeword. The LLRs of each LDPC type codeword are then iteratively processed using an LDPC type decoder 28. When the LDPC type decoding fails due to at least one of the codewords failing to converge, the LLRs for at least one of the un-converged codewords are updated using the Viterbi type detector 22, and the updated LLRs are processed again by the LDPC type decoder 28. The process of updating the LLRs of an un-converged codeword using the Viterbi-type detector 22 and reprocessing the updated LLRs by the LDPC type decoder 28 may be repeated N1 number of times. In one embodiment, the Viterbi type detector 22 and the LDPC type decoder 28 are replicated a number of times equal to the number of heads and corresponding read signals (e.g., 16 heads in the embodiment of FIG. 2A) such that a block of LDPC type codewords are decoded in parallel.

After processing the current block of LDPC type codewords over N1 iterations, the LLRs of the un-converged codewords for the current block are stored in a buffer at element 30. The next block of LDPC type codewords (e.g., as shown in FIG. 3A) are then processed by the Viterbi type detector 22 and the LDPC type decoder 28 over N1 iterations. After processing the current block of LDPC type codewords over N1 iterations, the LLRs of the un-converged codewords for the current block are stored in the buffer at element 30. After processing M blocks of LDPC type codewords such as shown in FIG. 3A, the corresponding M blocks parity is read from the magnetic tape and used to update the stored LLRs of the un-converged codewords at element 32. The updated LLRs are again processed by the LDPC type decoder 28, wherein the LLRs of any remaining un-converged codewords are again processed by the Viterbi type detector 22 and LDPC type decoder 28 over N2 iterations. After the N2 iterations, the LLRs of any remaining un-converged codewords are updated using the M blocks parity at block 32 and the process repeated over N3 global iterations. If after the N3 global iterations there are still un-converged codewords remaining, the un-converged codewords are stored as erased codewords at element 34. In one embodiment, an erased codeword may be stored as an identifier (e.g., an address) that identifies the codeword within the M blocks of LDPC codewords as being an erased (un-converged) codeword. After converting the un-converged codewords to erased codewords, in one embodiment the LLRs of the current M blocks of codewords stored at element 30 may be "deleted" so that the memory may be reused for a subsequent M blocks of codewords. This process is repeated for N of the M blocks of LDPC type codewords such as shown in FIG. 3A, wherein after processing N of the M blocks the redundancy of the erasure code is read from the magnetic tape as shown in FIG. 3B, and the erased codewords stored at element 34 of FIG. 5 are decoded using the erasure code decoder 36.

Any suitable technique may be employed to update the LLRs of a codeword using the M blocks parity. In one embodiment when processing the LLRs of the codewords corresponding to one of the M blocks parity bits, at least one of the LLRs across the un-converged codewords is modified so that the likelihood of a codeword bit flips its binary state, thereby satisfying the parity. When at least one of the LLRs is updated correctly, it improves the likelihood the corresponding codeword will converge during the subsequent processing by the LDPC type decoder 22. As each un-converged codeword converges, there is a corresponding improvement in the update accuracy of the M blocks parity, further improving the likelihood of recovering all of the un-converged codewords. A suitable technique for updating the LLRs of un-converged codewords using the M blocks parity is disclosed in U.S. Pat. No. 9,632,863 entitled "TRACK ERROR-CORRECTION CODE EXTENSION," the disclosure of which is incorporated herein by reference.

In one embodiment, an inline parity may be generated over each of the M blocks of LDPC type codewords shown in FIG. 3A, wherein the inline parity may be used to update the reliability metrics during the Viterbi type detection and LDPC type decoding iterations. That is, in one embodiment the M blocks parity shown in FIG. 3A may be augmented by an inline parity generated over each block of codewords. In yet another embodiment, the M blocks parity may be generated over interleaves of symbols in each LDPC type codeword, such as by generating a first parity over a first interleave (e.g., even interleave) of symbols of the LDPC type codewords, and generating a second parity over a second interleave (e.g., odd interleave) of symbols of the LDPC type codewords. In still another embodiment, multiple parities may be generated over different symbol resolutions (e.g., every ½ and every ¼ symbols) and the reliability metrics updated in a cascading manner starting with the lowest resolution parity. Examples of this embodiment are disclosed in U.S. Pat. No. 10,373,645 entitled "DATA STORAGE DEVICE DYNAMICALLY GENERATING EXTENDED REDUNDANCY OVER INTERLEAVES OF A DATA TRACK," the disclosure of which is incorporated herein by reference.

The processing order shown in the embodiment of FIG. 5 is to perform the M blocks parity update, followed by LDPC type decoding, followed by Viterbi type detection, followed by another LDPC type decoding, and so on. In other embodiments, there may be a different processing order, such as M blocks parity update, followed by LDPC type decoding, followed by another M blocks parity update, followed by a number of Viterbi/LDPC iterations. Various examples of different processing orders are disclosed in U.S. Pat. No. 10,592,334 entitled "DATA STORAGE DEVICE EMPHASIZING PARITY SECTOR PROCESSING OF UN-CONVERGED CODEWORDS," the disclosure of which is incorporated herein by reference.

Any suitable erasure code may be employed in the embodiment of FIG. 3A. In general, an erasure code generates redundancy by combining J of the LDPC type codewords, such as by XORing the LDPC type codewords, to generate K redundancy blocks. The K redundancy blocks are then capable of recovering K unrecoverable (erased) codewords by combining the K redundancy blocks with the recovered codewords. Referring to the embodiment shown in FIG. 3A, the redundancy of the erasure code may be generated in any suitable manner, such as by using a 24-way 8-bit symbol deep-interleave erasure code.

In one embodiment, the three tier coding scheme shown in the embodiment of FIG. 3A enables the control circuitry to correct various types of random and burst errors that may be typically seen in a magnetic tape storage system. FIG. 6A shows a segment of a magnetic tape 2 wherein the black dots represent random errors in the recorded data that are corrected using the first and second tiers of the coding scheme of FIG. 3A (i.e., the Viterbi/LDPC decoding augmented by the M blocks parity update). FIG. 6B shows a segment of the magnetic tape 2 wherein a long burst error 38 along the length of the tape segment may be caused by a defective read head, or a short burst error 40 may be caused by failing to acquire a sync mark. Both of these types of burst errors may be corrected using the first and second tiers of the coding scheme of FIG. 3A, wherein in one embodiment the LDPC type decoder may be further augmented by generating hard erasures when a burst error is detected from the read signal. An example of augmenting a LDPC type decoder using hard erasures is disclosed in U.S. Pat. No. 10,417,089 entitled "DATA STORAGE DEVICE EXTENDING ERASURES FOR LDPC-TYPE DECODING," the disclosure of which is incorporated herein by reference. FIG. 6C shows a segment of the magnetic tape 2 wherein a large block 42 of codewords are effectively erased due, for example, to the heads lifting off the magnetic tape during a read operation. The first and second tiers of the coding scheme (Viterbi/LDPC decoding and M blocks parity update) may be unable to correct a large block of erased codewords, whereas the third tier of the coding scheme of FIG. 3A (erasure code) is well suited for correcting this type of large block error. In one embodiment, a large block error 42 shown in FIG. 6C occurs infrequently as compared to the random errors of FIG. 6A or the burst errors of FIG. 6B. Accordingly in one embodiment, the first and second tiers of the coding scheme are typically sufficient to correct a majority of the errors, whereas the third tier erasure code may be needed occasionally to recover an infrequently occurring large block error.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In addition, any suitable electronic device, such as computing devices, data server devices, media content storage devices, etc. may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device configured to access a magnetic tape, the data storage device comprising:
   at least one head configured to access the magnetic tape; and
   control circuitry configured to:
      read data from the magnetic tape to generate a read signal;
      process the read signal to decode a first M blocks of low density parity check (LDPC) type codewords using a LDPC type decoder;
      decode first un-converged codewords out of the first M blocks using a first M-blocks parity; and
      decode second un-converged codewords out of the first M blocks using an erasure code.

2. The data storage device as recited in claim 1, wherein the erasure code covers a plurality of the M blocks of LDPC type codewords and a plurality of the M-blocks parity.

3. The data storage device as recited in claim 1, further comprising a plurality of heads configured to access a plurality of data tracks on the magnetic tape, wherein the control circuitry is further configured to:
   read data from each of the plurality of data tracks to generate a plurality of read signals; and
   process the plurality of read signals using a plurality of Viterbi type detectors to generate an array of detected symbols representing one of the blocks of LDPC type codewords, wherein each LDPC type codeword comprises a plurality of symbols spanning a diagonal of the array.

4. The data storage device as recited in claim 3, wherein each detected symbol is represented by a reliability metric for the symbol.

5. The data storage device as recited in claim 4, wherein the control circuitry is further configured to:
convert the second un-converged codewords into erased codewords; and
process the erased codewords to decode the second un-converged codewords using the erasure code.

6. The data storage device as recited in claim 4, wherein the control circuitry is further configured to:
convert the second un-converged codewords into first erased codewords;
after converting the second un-converged codewords into the first erased codewords, process the read signals to decode a second M blocks of LDPC type codewords using the LDPC type decoder;
decode third un-converged codewords out of the second M blocks using a second M-blocks parity;
convert fourth un-converged codewords out of the second M blocks into second erased codewords; and
process the first and second erased codewords to decode the second un-converged codewords and the fourth un-converged codewords using the erasure code.

7. A data storage device configured to access a magnetic tape comprising a plurality of data tracks, the data storage device comprising:
a plurality of heads configured to access the plurality of data tracks; and
control circuitry configured to:
read data from each of the plurality of data tracks to generate a plurality of read signals;
process the plurality of read signals using a plurality of Viterbi type detectors to generate an array of detected symbols representing a block of low density parity check (LDPC) type codewords out of a first M blocks of LDPC type codewords, wherein each LDPC type codeword comprises a plurality of symbols spanning a diagonal of the array;
process the detected symbols to decode the first M blocks of LDPC type codewords using a LDPC type decoder;
decode first un-converged codewords out of the first M blocks using a first M-blocks parity; and
decode second un-converged codewords out of the first M blocks using an erasure code.

8. The data storage device as recited in claim 7, wherein the erasure code covers a plurality of the M blocks of LDPC type codewords and a plurality of the M-blocks parity.

9. The data storage device as recited in claim 8, wherein each detected symbol is represented by a reliability metric for the symbol.

10. The data storage device as recited in claim 9, wherein the control circuitry is further configured to:
convert the second un-converged codewords into erased codewords; and
process the erased codewords to decode the second un-converged codewords using the erasure code.

11. The data storage device as recited in claim 9, wherein the control circuitry is further configured to:
convert the second un-converged codewords into first erased codewords;
after converting the second un-converged codewords into the first erased codewords, process the read signals to decode a second M blocks of LDPC type codewords using the LDPC type decoder;
decode third un-converged codewords out of the second M blocks using a second M-blocks parity;
convert fourth un-converged codewords out of the second M blocks into second erased codewords; and
process the first and second erased codewords to decode the second un-converged codewords and the fourth un-converged codewords using the erasure code.

12. A data storage device configured to access a magnetic tape, the data storage device comprising:
at least one head configured to access the magnetic tape;
a means for reading data from the magnetic tape to generate a read signal;
a means for processing the read signal to decode a first M blocks of low density parity check (LDPC) type codewords using a LDPC type decoder;
a means for decoding first un-converged codewords out of the first M blocks using a first M-blocks parity; and
a means for decoding second un-converged codewords out of the first M blocks using an erasure code.

13. A method of operating a data storage device, the method comprising:
reading data from a magnetic tape to generate a read signal;
processing the read signal to decode a first M blocks of low density parity check (LDPC) type codewords using a LDPC type decoder;
decoding first un-converged codewords out of the first M blocks using a first M-blocks parity; and
decoding second un-converged codewords out of the first M blocks using an erasure code.

14. The method as recited in claim 13, wherein the erasure code covers a plurality of the M blocks of LDPC type codewords and a plurality of the M-blocks parity.

15. The method as recited in claim 13, further comprising:
reading data from each of a plurality of data tracks on the magnetic tape to generate a plurality of read signals; and
processing the plurality of read signals using a plurality of Viterbi type detectors to generate an array of detected symbols representing one of the blocks of LDPC type codewords, wherein each LDPC type codeword comprises a plurality of symbols spanning a diagonal of the array.

16. The method as recited in claim 15, wherein each detected symbol is represented by a reliability metric for the symbol.

17. The method as recited in claim 16, further comprising:
converting the second un-converged codewords into erased codewords; and
processing the erased codewords to decode the second un-converged codewords using the erasure code.

18. A method of operating a data storage device, the method comprising:
reading data from each of a plurality of data tracks on a magnetic tape to generate a plurality of read signals;
processing the plurality of read signals using a plurality of Viterbi type detectors to generate an array of detected symbols representing a block of low density parity check (LDPC) type codewords out of a first M blocks of LDPC type codewords, wherein each LDPC type codeword comprises a plurality of symbols spanning a diagonal of the array;
processing the detected symbols to decode the first M blocks of LDPC type codewords using a LDPC type decoder;

decoding first un-converged codewords out of the first M blocks using a first M-blocks parity; and
decoding second un-converged codewords out of the first M blocks using an erasure code.

* * * * *